April 29, 1958     J. G. HART     2,832,225
WINDSHIELD WIPER ACTUATING MECHANISM
Filed Jan. 14, 1955     2 Sheets-Sheet 1

INVENTOR.
JOHN G. HART
BY
M. H. Strickland
HIS ATTORNEY

April 29, 1958　　　J. G. HART　　　2,832,225
WINDSHIELD WIPER ACTUATING MECHANISM
Filed Jan. 14, 1955　　　　　　　　　　2 Sheets-Sheet 2

INVENTOR.
JOHN G. HART
BY
Y. H. Strickland
HIS ATTORNEY

United States Patent Office 2,832,225
Patented Apr. 29, 1958

2,832,225
WINDSHIELD WIPER ACTUATING MECHANISM

John G. Hart, Rochester, N. Y., assignor to General Motors Corporation, Detroit, Mich., a corporation of Delaware Application January 14, 1955, Serial No. 481,767

20 Claims. (Cl. 74—70)

This invention pertains to mechanical movements, and particularly to mechanism for converting rotation to oscillation including means for varying the amplitude of oscillation imparted to a driven member which may be used to actuate windshield wipers.

Heretofore, it has been proposed to construct a crank assembly including a radially adjustable crank pin, a yoke for guiding the crank pin, an eccentric cooperable with the crank pin carrying member for varying the throw of the crank pin, and a torsion spring opposing outward radial movement of the crank pin. A crank assembly of this type is disclosed in copending application Serial No. 450,890, filed August 19, 1954, in the name of Walter D. Harrison. While crank assemblies of the aforementioned type operate satisfactory, these assemblies have a tendency to be noisy due to impact between the crank pin and the yoke when the throw of the crank pin is reduced to a minimum by the torsion spring. The present invention relates to a similar type crank assembly which results in quieter and smoother operation. Accordingly, among my objects are the provision of a mechanical movement for converting rotation to oscillation including means for varying the amplitude of oscillation; the further provision of a mechanical movement including adjustable crank means and eccentric means for adjusting the throw of the crank means; and the still further provision of a mechanical movement of the aforesaid type including cooperable pawl and latch members for effecting adjustment of the crank means in combination with cam means for retracting the latch and pawl member at a predetermined position of the crank assembly.

The aforementioned and other objects are accomplished in the present invention by the provision of eccentric means for varying the radius of a crank pin from the axis of rotation of a shaft. Specifically, the improved crank assembly comprises a rotatable shaft; a yoke member connected to rotate with the shaft; a cam having a circular aperture eccentric with respect to the shaft axis and carrying a crank pin; a disc assembly including an eccentric and a pivotally mounted, spring biased pawl for establishing an interruptible driving connection between the disc assembly and a worm gear; a worm gear having an internal cam surface; and a plate. The improved assembly eliminates the necessity for a torsion spring as used in the mechanism disclosed in the aforementioned application Serial No. 450,890.

The plate is attached to the shaft and rigidly connected to the worm gear. The shaft is rotatably journaled in a housing, the worm gear drivingly engaging a rotatable worm which may be driven by any suitable rotating apparatus, such as a unidirectional electric motor. The worm gear is formed with an axially extending flange, the internal periphery of which constitutes a cam surface. The disc assembly is rotatably journaled on the shaft, one end of the pawl being spring biased into engagement with the worm gear cam surface. The worm gear cam surface is formed with a notch adapted to retain the pawl in fixed relation relative to the worm gear and drivingly interconnect the disc assembly and the worm gear for rotation during normal running operation of the crank assembly. The eccentric of the disc assembly is disposed in the aperture of the cam. The crank pin is received in a radial slot of the yoke whereby the crank pin is free to move radially relative to the yoke while constrained for rotation therewith. The several parts are maintained in assembled relation by means of a washer and a snap ring, the yoke having a rectangular opening which engages flats on one end of the shaft.

During normal running operation, the pawl will be yieldingly maintained in a retracted position by its hairpin spring in the notched portion of the internal worm gear cam surface. Under these conditions, the eccentric will be positioned so that the crank pin is located at a minimum radial distance from the axis of the shaft, and the disc assembly is drivingly connected for rotation with the shaft through the pawl. The disc assembly constitutes a driven element, the shaft and worm gear, a driving member, and a second oscillatable shaft, a driven member in the windshield wiper actuating mechanism. The crank pin and the oscillatable shaft are operatively interconnected by linkage comprising a swingable connecting rod, a pair of cross links and a rocker arm. Linkages of this type are more fully described in copending applications Serial No. 435,012, filed June 7, 1954, and Serial No. 450,890, in the name of Walter D. Harrison, and constitute no part of this invention. When the pawl is retracted, oscillation of fixed magnitude will be imparted to the driven member upon rotation of the driving member.

In order to increase the amplitude of oscillation imparted to the driven member so as to park the wipers beyond one end of the normal wiping stroke, the actuating mechanism includes a latch assembly of the type shown in the aforementioned application Serial No. 450,890, which may be positioned so as to engage the pawl of the disc assembly. In this manner, rotation of the disc assembly is restrained, and continued rotation of the shaft, the yoke and the cam, or crank plate, throughout an angle of substantially 140° will result in maximum outward radial movement of the crank pin. Thus, the throw of the crank is increased to a maximum and the amplitude of oscillation imparted to the driven member is, likewise, increased. When the wipers reach the parked position, suitable switch means of the type shown in the aforementioned copending application Serial No. 435,012 are actuated to deenergize and dynamically brake the electric motor to a standstill.

When operation is resumed by energizing the electric motor and retracting the latch to its running position, the pawl will not be disengaged from the latch until the worm gear is rotated throughout an angle of approximately 80° relative to the pawl, at which time, a projection formed on the cam will engage the latch and move it to its retracted position. The disc assembly remains stationary until the worm gear is rotated throughout an angle of substantially 220° from the parked position since the extended pawl still engages the retracted latch, at which point, the pawl will drop into the notched portion of the internal worm gear cam. Thereafter, the retracted pawl will clear the retracted latch, the radius of the crank pin will be maintained at a minimum, and oscillation of fixed amplitude will be imparted to the driven member.

Further objects and advantages of the present invention will be apparent from the following description, reference being had to the accompanying drawings wherein a preferred embodiment of the present invention is clearly shown.

Figures 6, 7, 8, 9:
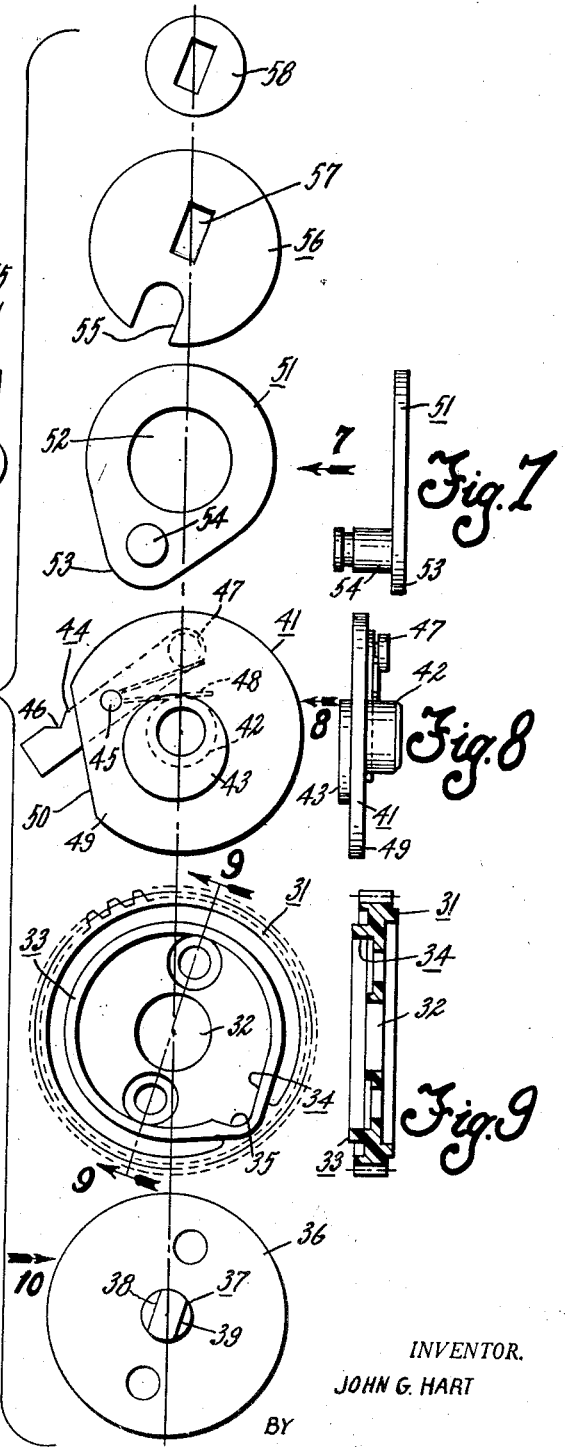
Fig. 6 is an exploded view of certain parts of the crank assembly, illustrating the relative positions when the mechanism is in the parked position.

Figs. 7 and 8 are views, in elevation, taken in the direction of arrows 7 and 8 of Fig. 6.

Fig. 9 is a sectional view, taken along line 9—9 of Fig. 6.

Figure 10:
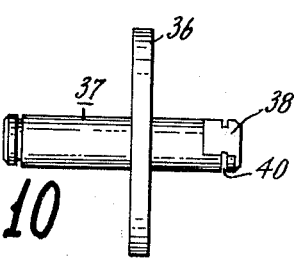

Fig. 10 is a view, in elevation, in the direction of arrow 10 in Fig. 6.

Figure 1:
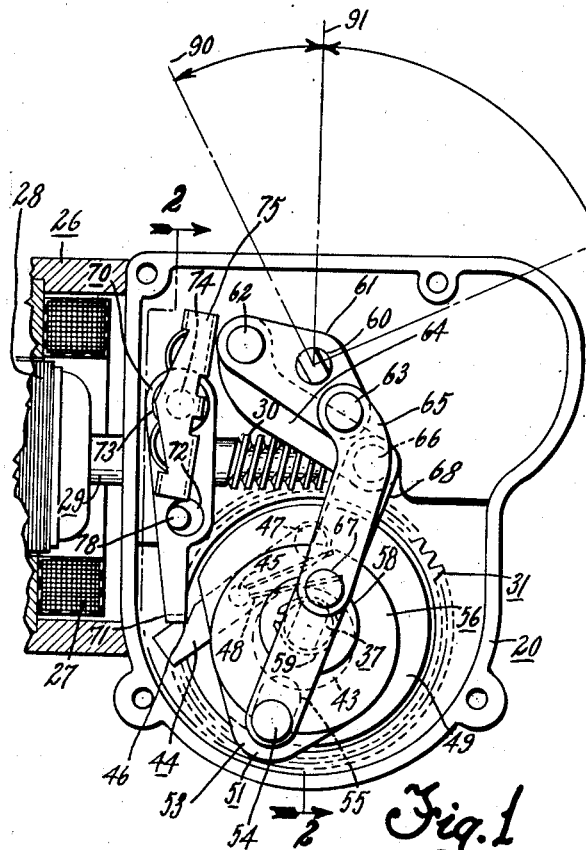
Fig. 1 is a fragmentary view, partly in section and partly in elevation, of actuating mechanism constructed according to this invention, the mechanical movement and the driven member being shown in the parked position.
Figure 2:
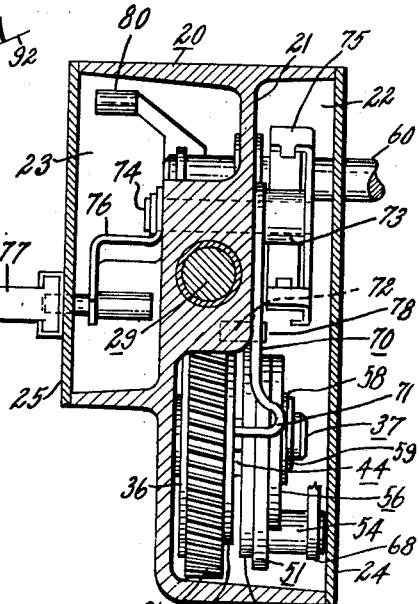
Fig. 2 is a sectional view, with certain parts removed, taken generally along the line 2—2 of Fig. 1.

With particular reference to Figs. 1 and 2, the motion converting mechanism to which this invention pertains, is disposed within a housing 20 which includes an integral web 21 that divides the housing into two chambers 22 and 23. Chamber 22 is closed by a plate 24 and contains the mechanical movement, while chamber 23 is closed by a plate 25 which contains the switch means, not shown, for controlling a unidirectional electric motor, generally depicted by the numeral 26. The electric motor is preferably of the cumulative compound wound, direct current type and includes field windings 27 and an armature 28. The armature 28 is drivingly connected with a shaft 29 having a worm 30 formed thereon.

The worm 30 drivingly engages a worm gear 31. As shown in Figs. 6 and 9, the worm gear 31 has a central aperture 32, and axially extending flange 33, the internal periphery of which constitutes a cam surface 34 having a notched portion 35. The worm gear 31 is designed for attachment to a plate 36 by means of a pair of rivets, not shown, which extend through aligned openings in the worm gear and plate. The plate 36 is rigidly connected with a shaft 37, such as by means of a weld, the shaft 37 having a pair of flats 38 and 39 formed on one end thereof, as well as an annular groove 40.

The shaft 37 is rotatably journaled within the housing 20 by suitable bearing means, not shown. Accordingly, upon rotation of the worm gear 31 due to rotation of the worm 30, rotation will be imparted to the shaft 37. A disc assembly 41 is rotatably mounted on the shaft 37 adjacent the worm gear 31. The disc assembly 41 includes a plate 49, a concentric sleeve portion 42, and an eccentric sleeve portion 43. In addition, a pawl 44 is pivotally mounted on the plate 49 by means of a pin 45. One end of the pawl 44 is formed with a notched portion 46, and the other end of the pawl has welded thereto, a pivot or a cam follower 47. The pin 45 supports a U-shaped hairpin type spring 48, one leg of which engages the concentric sleeve 42 and the other leg of which engages the pivot 47. In addition, plate 49 of the disc assembly is formed with a flat 50.

The eccentric sleeve 43 rotatably supports a cam member, or crank plate 51 having an eccentric circular aperture 52, and a cam projection 53. The crank plate 51 carries a crank pin 54. The crank pin 54 is guided for radial movement relative to the axis of the shaft 37 by means of a radial slot 55 in a yoke member 56 having a rectangular opening 57 which is received by the flats 38 and 39 of the shaft 37. Thus, the yoke 56 is connected to rotate with the shaft 37 and the crank plate 51 is connected to rotate with the yoke 56, although the crank pin 54 may move radially relative to the yoke 56. The component parts of the crank assembly are maintained in assembled relation with the shaft 37 by means of a washer 58 and a snap ring 59 which is situated in the annular groove 40 of the shaft 37.

As shown in Fig. 1, the wiper actuating mechanism includes an oscillatable shaft, or driven member, 60 which is rotatably supported in the housing 20 by a suitable bearing means, not shown. The shaft projects through the web 21, as seen in Fig. 2, thereby having portions disposed in chambers 22 and 23. The shaft portion disposed in chamber 22 has rigidly connected thereto a rocker arm 61, opposite ends of which are pivotally connected at 62 and 63 to a pair of crossed links 64 and 65, respectively. The other end of link 64 is connected by means of a pivot 66 to one end of a connecting rod 68, and the other end of link 65 is connected by means of a pivot 67 to the intermediate portion of the connecting rod 68. The other end of the connecting rod 68 is pivotally connected to the crank pin 54. This linkage is of the type disclosed in the aforementioned copending applications and constitutes no part of this invention. Suffice it to say that upon rotation of the crank pin 54, oscillation will be imparted to the driven shaft 60, which may be connected to windshield wipers in any conventional manner.

The wiper actuating mechanism also includes a latch arm assembly generally depicted by the numeral 70 of the type disclosed in the aforementioned copending application Serial No. 450,890, and forms no part of this invention. Suffice it to say that the latch arm assembly 70 includes a U-shaped end portion 71, an intermediate aperture 72 and a hub 73, as seen in Figs. 1 and 2. The hub 73 is journaled and rotates about a shaft 74, and is operatively interconnected with a toggle arm 75 through which the latch arm 70 is actuated. The toggle arm 75 is actuated by a crank arm 76 attached to the shaft 74 and operatively connected with a manually movable slider 77. Angular movement of the latch arm 70 is limited by a pin 78 which projects through the circular aperture 72 in the arm.

Figure 4:
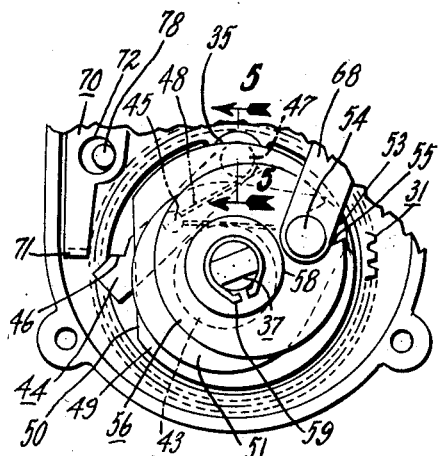
Figure 5:
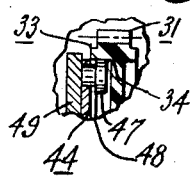
Fig. 5 is a fragmentary sectional view, taken along the line 5—5 of Fig. 4.

The end of the shaft 60 disposed in the switch chamber 23 has connected thereto a crank arm 80 which actuates a parking switch, not shown, for deenergizing the electric motor 26 and thereafter establishing a self-generative dynamic braking circuit therefor, as disclosed in the afore-mentioned copending application Serial No. 435,012. During normal running operation of the actuating mechanism, the pivot 47 of the pawl 44 is retained in the notched portion 35 of the internal cam 34 formed on the worm gear 31. The hairpin spring 48 normally maintains the pivot pin 47 within the notch 35 so that when the latch arm 70 is in the retracted position, as shown in Fig. 4, the retracted pawl 44 will not engage the U-shaped end 71 thereof. Accordingly, the radial distance of the crank pin 54 from the axis of the shaft 37 is a minimum and will be maintained at this minimum radius during rotation of the worm gear 31 by the worm 30.

*Operation*

Figure 3:
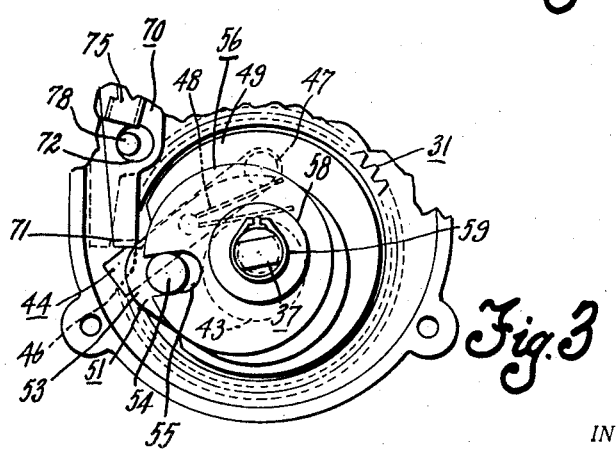
Figs. 3 and 4 are fragmentary views, partly in section and partly in elevation, of the actuating mechanism in the coming out of park condition and the running condition, respectively.

Operation of the actuating mechanism with the improved crank assembly is as follows. A complete cycle of operation starting from the parked position and returning to the parked position will be described. The driven shaft 60 will be in the position indicated by line 90 when the actuating mechanism is in the parked position. When the electric motor 26 is energized, the toggle arm 75 will be snapped in a counterclockwise direction, as viewed in Fig. 1 due to movement of the crank arm 76 and the shaft 74, as more particularly set forth in the aforementioned copending application Serial No. 450,890. In the parked position, the notched surface 46 of the extended pawl 44 is in engagement with the U-shaped end 71 of the latch arm 70. Thus, ordinarily by snapping the toggle arm 75 in a counterclockwise direction, the latch arm 70 will not move in a clockwise direction about shaft 74, as viewed in Fig. 1. Accordingly, upon rotation of the armature shaft 29 and the worm 30, rotation will be imparted to the worm gear 31, the shaft 37, the yoke 56 and the crank plate 51, while the disc assembly 41 remains stationary. After approximately 55° rotation of the crank plate 51 in a clockwise direction from the parked position of Fig. 1 to the position depicted in Fig. 3, the cam projection 53 on the crank plate 51 will engage the U-shaped end 71 of the latch arm 70 and move it in a clockwise direction to the dotted line position of Fig. 3, which is the retracted position of the latch arm. During rotation of the crank plate 51 between the positions of Fig. 1 and Fig. 3, the crank pin 54 moves radially inward towards its minimum radius position due to the construction of the eccentric sleeve 43. The cam projection 53 in moving the latch arm 70 to the retracted position does not result in disengagement of the pawl 44 therewith since the pawl 44 is in the extended position. Thus, the disc assembly 41 remains stationary while the shaft 37, the worm gear 31, the crank plate 51 and the yoke 56 continue to rotate in a clockwise direction. After these parts have rotated approximately 165° in a clockwise direction from the position of Fig. 3, the radius of the crank pin 54 will be at a minimum since the crank pin will be at the inner end of the radial slot 55 in the yoke 56 due to the fact that the operating portion of the aperture 52 in the crank plate is in engagement with the low point on the eccentric 43. At this time, the pivot pin 47 of the pawl 44 will drop into the notch 35 of the internal cam on the worm gear whereupon the pawl 44 will be retracted so that the notched end 46 will be disengaged from the retracted latch arm 70. Accordingly, during continued rotation of the worm gear and shaft 37, the disc assembly 41 will rotate with the shaft 37 due to the driving connection between the worm gear 31 and the disc assembly 41, as constituted by the pivot 47. Consequently, with the radius of the crank pin 54 at a minimum, which radius is constant during running operation of the actuating mechanism, oscillation of fixed amplitude will be imparted to the shaft 60 between lines 91 and 92, as depicted in Fig. 1. This operation will continue as long as the motor 26 is energized.

When it is desired to interrupt operation of the actuating mechanism, the amplitude of oscillation imparted to the shaft 60 will be automatically increased throughout the angle between lines 91 and 90 and the electric motor will be dynamically braked so as to arrest movement of the shaft 60 at the position depicted by line 90. This operation is accomplished by movement of the slider 77 to the off position which will result in positioning the toggle arm 75 in the position of Fig. 1. Accordingly, the latch arm 70 will be snapped from the full line position of Fig. 4 to the full line position of Fig. 1 so as to engage the retracted pawl 44 when the disc assembly 41 is in the angular position depicted in Fig. 4. When the notched portion 46 of the pawl 44 engages the latch arm 70, rotation of the disc assembly will be restrained, and, accordingly, the pivot pin 47 will be withdrawn from the notch 35 in the internal worm gear cam 34 due to continued rotation of the worm gear, and the crank plate 51 will rotate about the eccentric sleeve 43 so as to increase the radius of the crank pin 45. After approximately 140° clockwise rotation of the crank plate 51 from the position of Fig. 4 to the position of Fig. 1, the crank throw will have been increased to a maximum so that the shaft 60 will be in the position depicted by line 90. At this time, the crank arm 80 will actuate the parking switch, not shown, as disclosed in the aforementioned copending application Serial No. 435,012 to simultaneously deenergize the motor 26 and dynamically brake the armature 28 to a standstill.

From the foregoing it is apparent that the present invention results in a crank assembly wherein the crank pin is not moved from its position of maximum throw to its position of minimum throw by means of a spring which results in noisy operation. Conversely, in the instant crank assembly, the radius of the crank pin is gradually increased and gradually decreased which results in decidedly quieter and smoother operation of the actuating mechanism.

While the embodiment of the present invention as herein disclosed, constitutes a preferred form, it is to be understood that other forms might be adopted.

What is claimed is as follows:

1. Windshield wiper actuating mechanism including, a rotatable driving member, a wiper actuating driven member, a rotatable driven element, a spring biased pawl carried by said driven element and operable to engage said driving member so as to establish an interruptible driving connection therebetween, and means interconnecting said driving and driven members including a variable throw crank, the throw of said crank being automatically variable upon interruption of the driving connection between said driving member and said driven element.

2. Windshield wiper actuating mechanism including, a rotatable driving member, a wiper actuating driven member, a rotatable driven element, a spring biased pawl carried by said element and operable to engage said driving member so as to establish an interruptible driving connection between said driving member and said driven element, means interconnecting said driving and driven members including a variable throw crank, and an eccentric carried by said driven element and operatively associated with said crank whereby effecting relative rotation between said driven element and said driving member about the axis of said driving member varies the throw of said crank.

3. Windshield wiper actuating mechanism including, a rotatable driving member having a notch therein, a wiper actuating driven member, a rotatable driven element, spring biased means carried by said driven element and operable to engage the notch in said driving member so as to establish an interruptible driving connection between said driving member and said driven element, and means interconnecting said driving and driven members including a variable throw crank, the throw of said crank being automatically variable upon interruption of the driving connection between said driving member and said driven element.

4. Windshield wiper actuating mechanism including, a rotatable driving member having a notch therein, a wiper actuating driven member, a rotatable driven element, a spring biased pawl carried by said driven element and operable to engage the notch in said driving member so as to establish an interruptible driving connection between said driving member and said driven element, means interconnecting said driving and driven members including a variable throw crank, the throw of said crank being automatically variable upon interruption of the driving connection between said driving member and said driven element, and means operable to interrupt said driving connection so as to cause a variation in the throw of said crank.

5. Windshield wiper actuating mechanism including, a rotatable driving member having a notch therein, a wiper actuating driven member, a rotatable driven element, a spring biased pawl carried by said driven element and operable to engage the notch in said driving member so as to establish an interruptible driving connection between said driving member and said driven element, means interconnecting said driving and driven members including a variable throw crank, the throw of said crank being automatically variable upon interruption of the driving connection between said driving member and said driven element, and an eccentric carried by said driven element and operatively associated with said crank for varying the throw of said crank upon interruption of the driving connection between said driving member and said driven element.

6. Windshield wiper actuating mechanism including, a rotatable driving member, a wiper actuating driven member, a driven element rotatably journaled on said driving member, a spring biased pawl carried by said driven element and operable to engage said driving member so as to establish an interruptible driving connection between said driven element and said driving member, means interconnecting said driving and driven members including a variable throw crank, and means whereby stopping rotation of said driven element during continued rotation of said driving member varies the throw of said crank.

7. The mechanism of the character set forth in claim 6 wherein said last recited means includes a crank plate which carries said crank, said crank plate being constrained for rotation with said driving member although adapted for radial movement relative thereto and having an aperture therein, and a complementary eccentric disposed in said aperture and carried by said driven element.

8. Windshield wiper actuating mechanism including, a rotatable driving member having a notch therein, a wiper actuating driven member, a driven element, a spring biased pawl carried by said driven element and operable to engage the notch in said driving member so as to establish an interruptible driving connection between said driving member and said driven element, means interconnecting said driving and driven members including a variable throw crank, the throw of said crank being automatically variable upon arresting rotation of said driven element during continued rotation of said driving member due to interruption of the driving connection therebetween, and manually controlled means engageable with said pawl for interrupting said driving connection and arresting rotation of said driven element so as to cause a variation in the throw of said crank.

9. Mechanism of the character set forth in claim 8 wherein said crank comprises a crank plate having attached thereto a crank pin, said crank plate being constrained for rotation with said driving member although adapted for radial movement relative thereto.

10. Mechanism of the character set forth in claim 9 wherein said crank plate includes a circular aperture, the axis of which is eccentric with respect to the axis of said driving member, and wherein said driven element includes a complementary eccentric disposed in the aperture of said crank plate.

11. Mechanism of the character set forth in claim 8 wherein said manually controllable means comprises a latch arm which may be extended so as to engage said pawl in its retracted position.

12. Mechanism of the character set forth in claim 11 wherein said variable throw crank comprises a crank plate carrying a crank pin, said crank plate having a radially extending cam projection engageable with said latch arm for effecting movement thereof to its retracted position when the pawl is in its extended position upon continued rotation of said driving member after the throw of said crank has been increased to a maximum.

13. A variable throw crank assembly including in combination, a rotatable shaft, a first member connected to rotate with said shaft but adapted for radial movement relative thereto, a second member drivingly connected to said shaft for imparting rotation thereto, an element rotatably journaled on said shaft, a spring biased pawl carried by said element and operable to engage said second member so as to establish an interruptible driving connection between said second member and said element, said first member constituting a crank, the throw of which may be varied, and means for varying the throw of said crank upon interruption of the driving connection between said element and said second member.

14. A variable throw crank assembly including, a rotatable shaft, crank mechanism connected to rotate with said shaft but adapted for radial movement relative thereto, a member drivingly connected with said shaft for imparting rotation thereto, a disc assembly rotatably journaled on said shaft, spring biased means carried by said disc assembly and operable to engage said member so as to establish an interruptible driving connection therebetween, and means interconnecting said disc assembly and said crank mechanism whereby effecting relative rotation between said disc assembly and said shaft will effect radial movement of said crank mechanism.

15. A variable throw crank assembly including, a rotatable shaft, a gear connected to said shaft for imparting rotation thereto, said gear having an internal cam surface with a notch therein, a disc assembly rotatably journaled on said shaft and carrying a spring biased pawl engageable with said notch for establishing an interruptible driving connection between said disc assembly and said gear, a crank plate connected for rotation with said shaft but adapted for radial movement relative thereto, and means interconnecting said disc assembly and said crank plate whereby relative rotation therebetween due to interruption of the driving connection between said disc assembly and said gear will result in radial movement of said crank plate.

16. A crank assembly of the character set forth in claim 15 wherein said crank plate carries a crank pin, and wherein the connection between said shaft and said crank plate comprises a yoke drivingly connected with said shaft and having a radial slot within which said crank pin is confined whereby said crank plate is free to move radially relative to said shaft although constrained for rotation therewith.

17. A crank assembly of the character set forth in claim 15 wherein said crank plate is formed with a circular aperture, the axis of which is eccentric with respect to the axis of said shaft, and wherein the means interconnecting said disc assembly and said crank plate comprises an eccentric sleeve carried by said disc assembly and disposed within the eccentric aperture in said crank plate.

18. A variable throw crank assembly of the character set forth in claim 15 wherein said pawl is pivotally connected to said disc assembly between its ends, and wherein one end of said pawl has attached thereto a pivot which constitutes a cam follower engageable with the cam surface of said gear.

19. A variable throw crank assembly of the character set forth in claim 18 wherein the spring biasing for the pawl is constituted by a hairpin spring, the bight of which is carried by said intermediate pivot of said pawl, opposite legs of said hairpin spring engaging the cam follower and said disc assembly respectively.

20. Windshield wiper actuating mechanism including, a rotatable driving member, a wiper actuating driven member, a rotatable driven element, means carried by said driven element and operable to engage said driving member so as to establish a driving connection therebetween, and means interconnecting said driving and driven members including variable throw crank means, the throw of said crank means being automatically variable upon interruption of the driving connection between said driving member and said driven element by disengaging said driven element carried means from said driving member.

References Cited in the file of this patent

UNITED STATES PATENTS 2,452,496    Schneider _____ Oct. 26, 1948

FOREIGN PATENTS 499,082    Great Britain _____ Jan. 18, 1939
873,802    Germany _____ Apr. 16, 1953